March 15, 1927.

B. C. VON PLATEN ET AL 1,620,843

ABSORPTION REFRIGERATING APPARATUS

Filed Aug. 4, 1923     3 Sheets-Sheet 1

Inventors
B.C. von Platen
C.G. Munters
By Marks & Clerk
Attys.

March 15, 1927. B. C. VON PLATEN ET AL 1,620,843
ABSORPTION REFRIGERATING APPARATUS
Filed Aug. 4, 1923  3 Sheets-Sheet 2

Inventors
B. C. von Platen
C. G. Munters
By Marks & Clerk
Attys.

March 15, 1927. 1,620,843
B. C. VON PLATEN ET AL
ABSORPTION REFRIGERATING APPARATUS
Filed Aug. 4, 1923 3 Sheets-Sheet 3
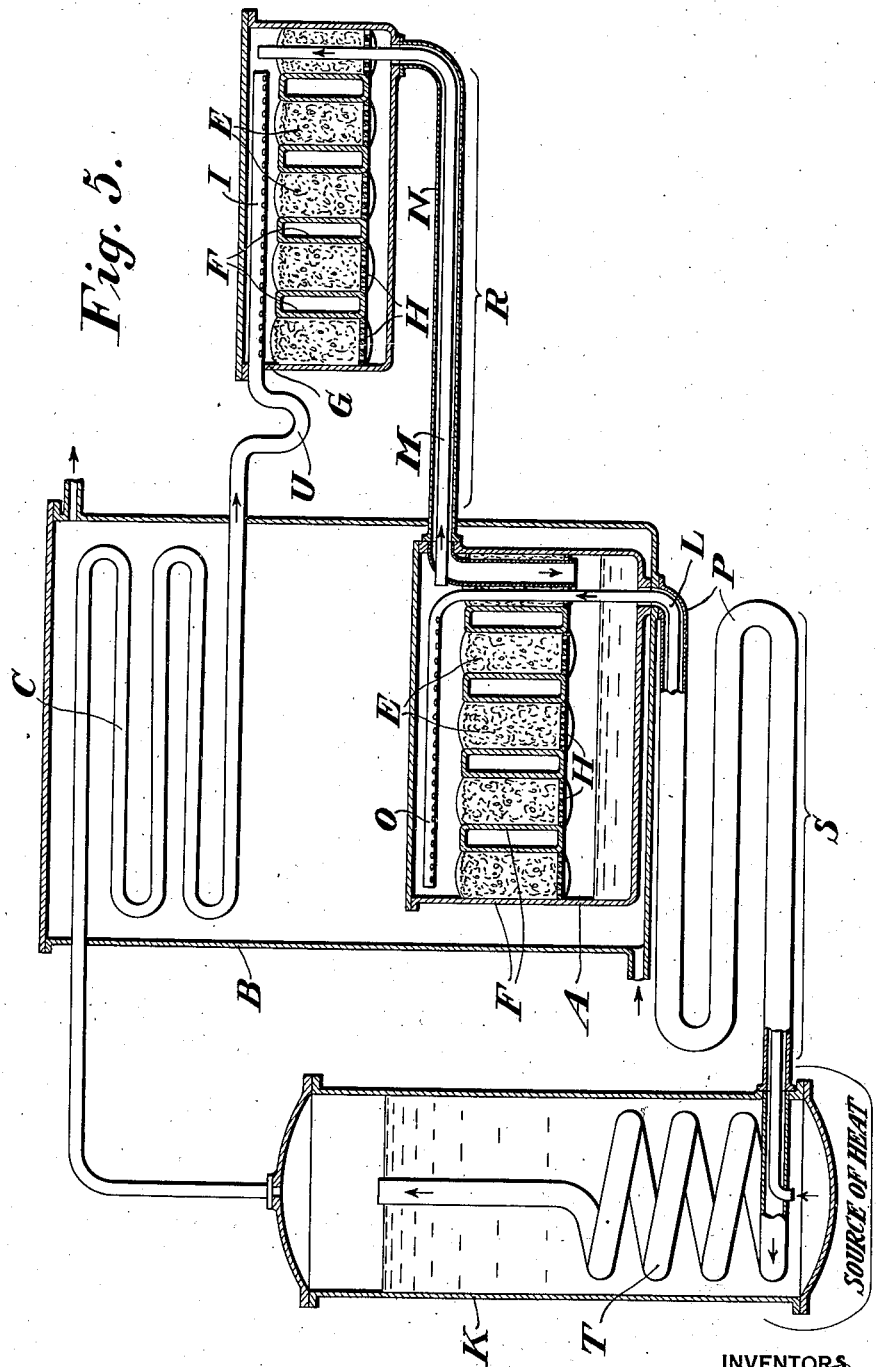

Patented Mar. 15, 1927.

1,620,843

UNITED STATES PATENT OFFICE.

BALTZAR CARL VON PLATEN, OF YSTAD, AND CARL GEORG MUNTERS, OF DALA-JARNA, SWEDEN, ASSIGNORS, BY MESNE ASSIGNMENTS, TO ELECTROLUX SERVEL CORPORATION, A CORPORATION OF DELAWARE.

ABSORPTION REFRIGERATING APPARATUS.

Application filed August 4, 1923, Serial No. 655,768, and in Sweden August 18, 1922.

The invention relates to absorption refrigerating apparatus in which the absorption liquid is circulated through the boiler and the absorber and more particularly to absorption refrigerating apparatus of the kind in which the boiler and the absorber are arranged in open communication with one another.

Figure 1:
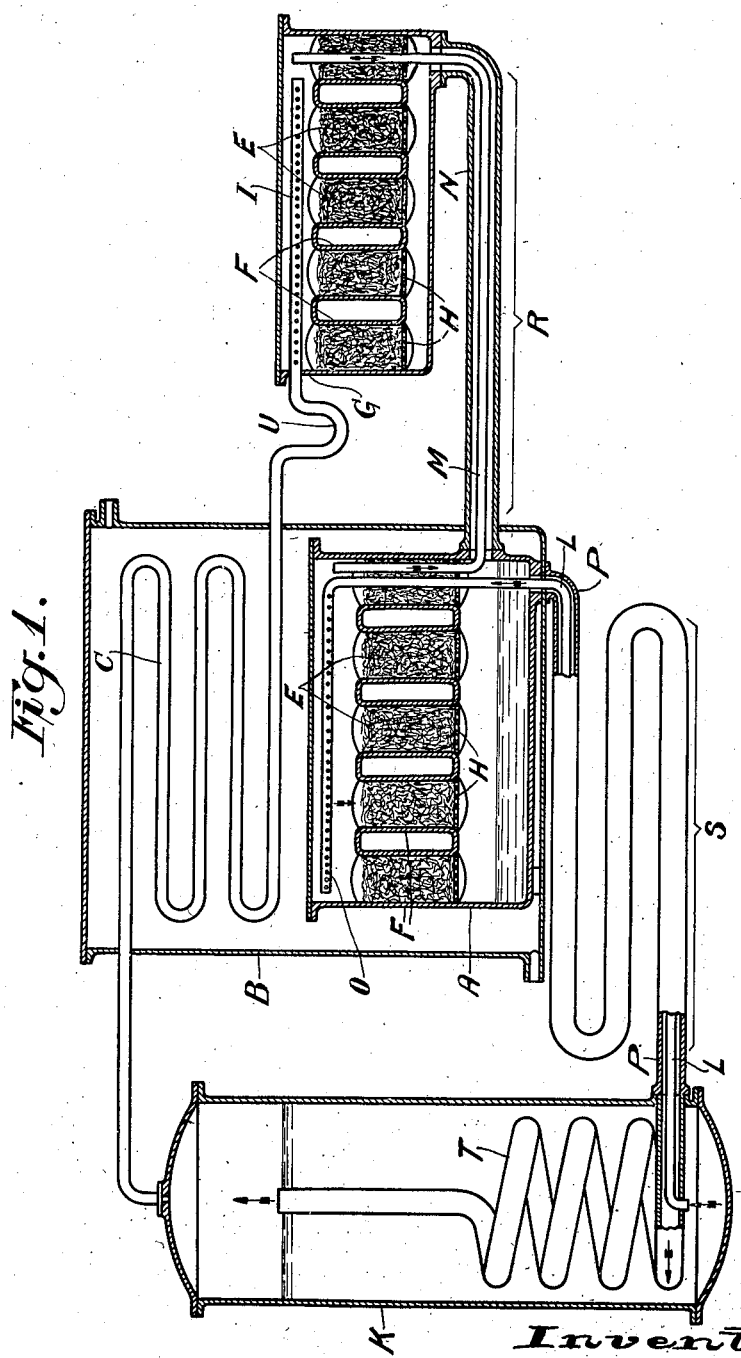
Figure 2:
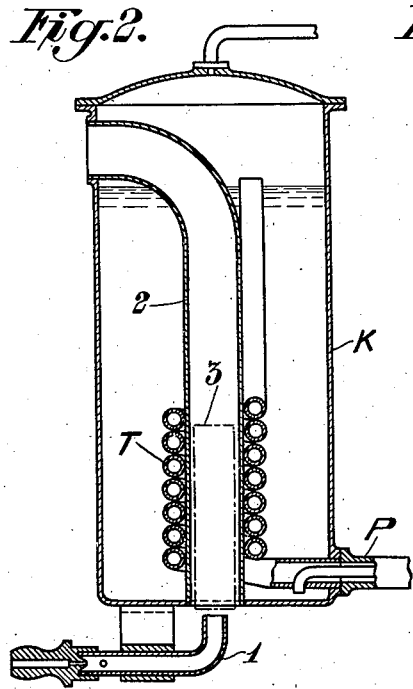
Figure 3:
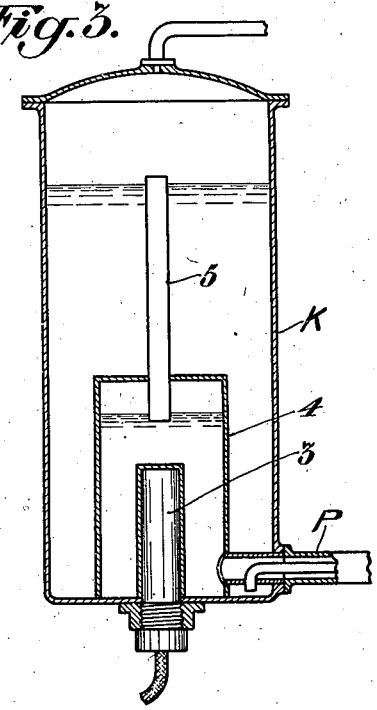
Figure 4:
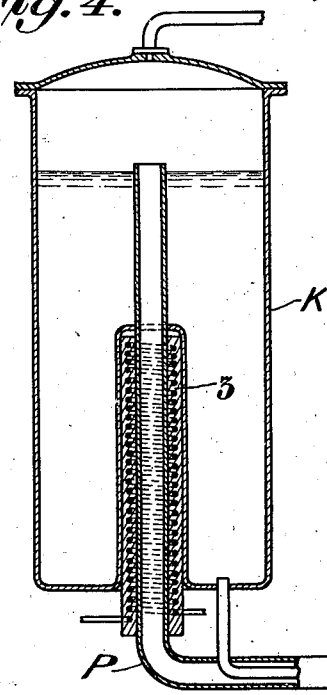

The invention will be more closely described with reference to the accompanying schematic drawing, in which Fig. 1 illustrates an embodiment of the invention. Figs. 2, 3 and 4 show three different modifications of the liquid circulating device. Fig. 5 shows another embodiment of the invention.

The refrigerating apparatus comprises a boiler K, a cooler G and an absorber A. The boiler K contains the cooling agent for instance ammonia, dissolved in water, whereas the cooler G and the absorber A contain a gas or gas mixture, which is inert with respect to the cooling agent and which may be hydrogen. The cooler and the absorber preferably contain a porous or fibrous material E, for instance metal wool or cuttings, disposed in a number of tubular cells F, which communicate with one another at the top and at the bottom, and which are provided with perforated bottoms H. Said porous or fibrous material serves as a means for distributing the liquid entering the cooler, and the absorber respectively, over a large surface at the same time facilitating the transfer of heat. The gas chamber of the boiler is connected by means of a condenser coil C, placed together with the absorber in a cooling water tank B, with the upper part of the cooler G, the end of the pipe entering the cooler forming a perforated distributor I. The cooler G and the absorber A are arranged in unobstructed communication with one another by means of pipes M and N connecting the receptacles at the top and at the bottom respectively and forming together a heat exchanger R, the pipe M being located inside the pipe N. The cooler should generally be located at a higher level than the absorber in order to prevent the lower pipe connection between the cooler and the absorber to be closed up by liquid (see Fig. 5).

The boiler and the absorber are connected with one another by means of pipes L and P so as to form a closed circulating system for the absorption liquid, the boiler and the absorber being thus permanently in open communication with one another. The pipe L opens at one end into the boiler at the bottom thereof and at the other end into the upper part of the absorber, the latter end of the pipe forming a perforated distributor O. The pipe L is located inside the pipe P so as to form a heat exchanger S. The end of the pipe P entering into the boiler is formed into a coil T, for facilitating the transfer of heat, and opens either into the liquid or into the gas space immediately above the surface of the liquid. Said coil T operates as a thermo-siphon to circulate the absorption liquid. The boiler is heated at the bottom in any suitable way.

The apparatus operates as follows:

On heating the boiler the ammonia will be expelled from the water and caused to flow from the boiler through the condenser coil C, and a liquid seal U to the cooler G. The ammonia will be condensed in the condenser so as to reach the cooler in a liquid condition. The ammonia will, consequently, flow into and spread over the porous or fibrous material E at the same time evaporating and diffusing into the hydrogen in the cooler while absorbing heat from the surroundings of the cooler. The mixture of hydrogen and ammonia, which is heavier than the hydrogen itself, will flow through the pipe N into the cooled absorber A and in rising through the fibrous material E in the cells F it will be brought in contact with the liquid flowing down through the absorber, the ammonia but not the hydrogen being then dissolved or absorbed in the liquid. The ammonia will thus be separated from the gas mixture, whereas the hydrogen will rise through the absorber and return to the cooler G through the pipe M. In entering the cooler the hydrogen will again mix with fresh ammonia vapour. The automatic circulation of the inert gas will thus be maintained substantially on account of the difference of the specific weights of the inert gas and the vapours of the cooling agent but also owing to the cooling of the gases in the cooler and the heating of the gases in the absorber, the specific weight of the gases being thereby increased and decreased respectively.

All parts of the apparatus being in open and unobstructed communication with one another, substantially the same absolute pressure will prevail throughout the whole apparatus.

The circulation of the absorption liquid will be effected in such a manner that the concentrated solution collecting at the bottom of the absorber is returned to the boiler through the pipe P, whereas the liquid which is poor in ammonia is supplied to the absorber through the pipe L. The circulation is maintained exclusively by the thermal connection between the circulating system and the boiler, the liquid being preheated in the heat exchanger S and further heated in the coil T, which then operates as a thermosiphon through which the liquid is lifted by the gas developed therein to a level that is high enough to allow the liquid to flow directly into the absorber. It should be observed that the level of the liquid in the boiler need not necessarily be higher than the level of the distributor O in the absorber. A certain difference between the pressures in the boiler and the absorber might occur on account of the flow resistance in the condenser or by throttling the flow of ammonia to the cooler the pressure being then somewhat higher in the boiler than in the absorber. Such a rise of pressure in the boiler will evidently lower the liquid level in the boiler and raise the liquid level in the absorber to a corresponding extent.

In the embodiment shown in Fig. 1 the supply of heat to the liquid circulating pump T is effected indirectly through the liquid contents of the boiler, the pump being provided in the liquid chamber of the boiler, while the boiler is adapted to be heated externally. This arrangement has the disadvantage that the heat supplied to the boiler is taken up in the first instance by the liquid discharged from the pump said liquid being already partly deprived of gas, whereas the pump is heated only indirectly through the liquid. Owing to this fact the development of gas in the liquid pump may under certain circumstances particularly at high pressures in the system and weak concentration of the ammonia solution, be too little to cause the pump to work satisfactorily. Said disadvantage is overcome according to the invention by the supply of heat being directed in the first instance to the rich ammonia solution flowing through the pump as illustrated in Figs. 2, 3 and 4 in which the liquid pump is arranged in direct thermal relation to the source of heat of the boiler. The proportion of the gas quantities developed in the pump and in the boiler is thereby changed so that a relatively large amount of gas will be separated out already in the liquid pump, whereby a satisfactory circulation of the liquid is obtained under all circumstances.

In the arrangements shown in Fig. 2 the boiler K is adapted to be heated by means of a gas burner 1 provided at the lower opening of a tube 2 extending through the boiler and adapted to be heated by the combustion gases and to transfer heat to the liquid contents of the boiler. The leading-in pipe P, which conveys liquid rich in ammonia, is formed into a coil T surrounding the tube 2. The coil T is then in direct thermal connection with the heating device and will therefore be heated vigorously so that the liquid entering the boiler will be deprived of gas to a great extent already in the coil, whereby the circulation of the liquid is secured. If it is wanted to further increase the temperature of the pump a sleeve or coating of heat insulating material may be provided on the outer side of the pump to impede the transmission of heat to the liquid contents of the boiler. For the same purpose the coil may instead of it be provided inside the tube 2 so that it will be directly swept by the combustion gases.

The apparatus may be provided with electrical heating. In the arrangement according to Fig. 2 it is possible without altering the construction of the apparatus to use alternatively either gas heating or electrical heating. In the case last mentioned an electrical heater 3 may be introduced in the lower part of the tube 2 as shown in chain lines.

In Fig. 3 the pump consists of a receptacle 4 provided in the liquid chamber of the boiler said receptacle being connected at one side to the pipe P and at the other side through a riser pipe 5 to the gas chamber of the boiler. In this case the heating device consists of an electrical heater 3 inserted in the receptacle 4 so as to be surrounded on all sides by the liquid contents of the receptacle 4. The pumping is effected by the gas developed in the receptacle 4 forcing periodically a liquid column upward through the pipe 5. Upon the liquid level in the receptacle 4 thus sinking below the opening of the pipe 5, the gas will escape through the pipe 5 thereby causing the liquid in the pipe to be discharged into the boiler. At the same time the pressure will be equalized so as to allow a new quantity of liquid to flow into the receptacle 4 the said course of operation being then repeated.

Fig. 4 shows another construction in which the electrical heater is made in the form of a hollow cylinder enclosing the pipe P which is arranged centrally in the boiler. In this arrangement the rich ammonia solution entering the boiler as well as the liquid contents of the boiler will be subjected to a direct heating by the heater 3. Also in this case the supply of heat to the pump may be regulated in the above mentioned way by providing a suitable heat insulation which will impede the transfer of heat to the liquid contents of the boiler.

The member K is more generally termed "generator" than "boiler." The appended claims therefore use "generator" as designating member K or a device used in place thereof. The member G is more generally termed "evaporator" than "cooler." The appended claims therefor use "evaporator" as designating member G or a device used in place thereof.

We claim:

1. Refrigerating apparatus comprising a generator, a condenser, an evaporator, an absorber, means to interconnect the generator, condenser, evaporator and absorber to maintain the same total pressure therein, said means including a liquid seal interposed between the condenser and evaporator.

2. Refrigerating apparatus comprising a generator, a condenser, an evaporator, an absorber, means to interconnect the generator, condenser, evaporator and absorber, said means including connections between the absorber and evaporator arranged to form a circuit, and a liquid seal interposed between the condenser and evaporator.

3. Refrigerating apparatus comprising a generator, a condenser, an absorber, an evaporator having its bottom situated at a higher level than the top of said absorber, means to interconnect the generator, condenser, evaporator and absorber to maintain the same total pressure therein, said means including vertically extending communications between the absorber and evaporator arranged to form a circuit, said circuit being arranged to contain vertically extending bodies of fluid of such nature that circulation is caused to take place within said circuit due to difference in specific weights of different vertically extending bodies and said communications being arranged to allow flow of liquid therein from their evaporator ends and in one direction throughout their lengths and through their absorber ends into the absorber.

4. Refrigerating apparatus comprising a generator, a condenser, an absorber and an evaporator having its bottom situated at a higher level than the top of said absorber, the aforementioned parts being arranged in a circuit, means to conduct gas from the lower part of the evaporator downwardly to the absorber and means to conduct gas from the absorber upwardly to the upper part of the evaporator.

5. Refrigerating apparatus comprising a generator, a condenser, an evaporator space and an absorbing space arranged in a circuit, the bottom of said evaporator space being situated at a higher level than the top of said absorbing space, and means to move gases vertically through said spaces in opposite directions.

6. Refrigerating apparatus comprising a generator, a condenser, an evaporator, an absorber, the bottom of said evaporator being arranged at a higher level than the top of said absorber and independently thereof, a heat exchanger, and a plurality of pipes connecting said evaporator, said absorber and said heat exchanger to form with said evaporator, said absorber and said heat exchanger a closed circuit for an auxiliary agent in the presence of which the cooling agent evaporates, and wherein heat is transferred from fluid passing upwardly from said absorber to said evaporator into fluid passing downwardly from said evaporator into said absorber.

7. Refrigerating apparatus comprising a generator, a condenser, an absorber, an evaporator, connections between the generator, condenser, evaporator and absorber for circulation of fluid, said connections including a conduit connecting the top of the absorber with the top of the evaporator and a conduit connecting the bottom of the evaporator with the bottom of the absorber, said conduits being arranged one within the other in heat exchange relation, said evaporator being arranged with its bottom higher than the top of the absorber and said conduits being arranged to permit flow of liquid therein into the absorber.

8. A refrigerating system comprising a generator, a condenser, an evaporator and an absorber forming a circuit for a cooling agent and including a pipe connection between the condenser and evaporator having a portion bent downwardly and again upwardly and adapted to hold liquid therein and a second circuit for an auxiliary agent including the evaporator and the absorber, said second circuit being of such nature as to permit circulation of said auxiliary agent therein due to factors wholly within the system.

9. Refrigerating apparatus comprising a generator, a condenser, an evaporator, an absorber, means to interconnect the generator, the condenser, the evaporator and the absorber to maintain the same total pressure therein, said means including a coil within the generator heated exclusively by liquid therein and a pipe connection between the condenser and evaporator having a portion bent downwardly and again upwardly and adapted to hold liquid therein.

10. Refrigerating apparatus comprising a generator, a condenser, an evaporator, an absorber, the bottom of said evaporator being arranged at a higher level than the top of said absorber and said evaporator being arranged independently of said absorber and a plurality of pipes connecting said evaporator and absorber to form with said evaporator and absorber a closed circuit for an auxiliary agent in the presence of which the cooling agent evaporates.

In testimony whereof we affix our signatures.

BALTZAR CARL von PLATEN.
CARL GEORG MUNTERS.